J. BENNY.
SHOCK ABSORBER.
APPLICATION FILED JUNE 25, 1912.
1,037,583.
Patented Sept. 3, 1912.
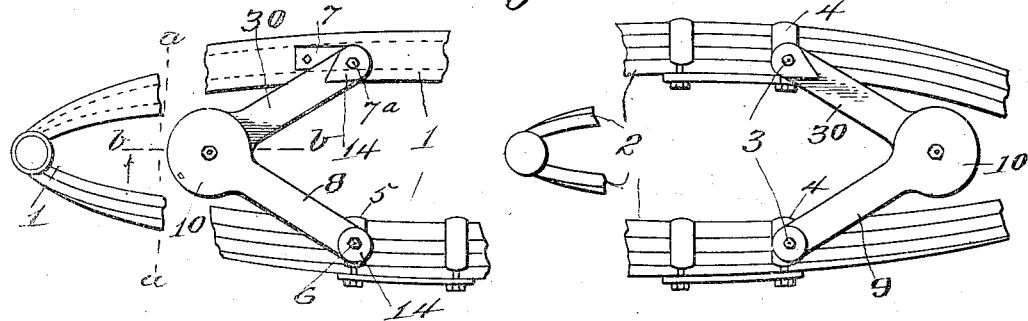
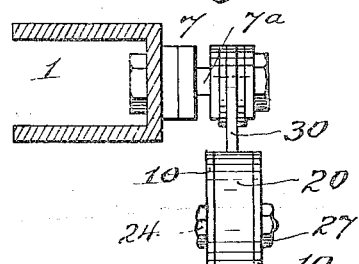
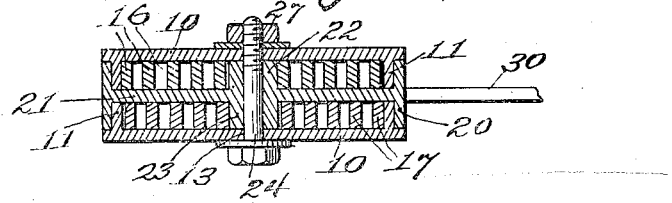
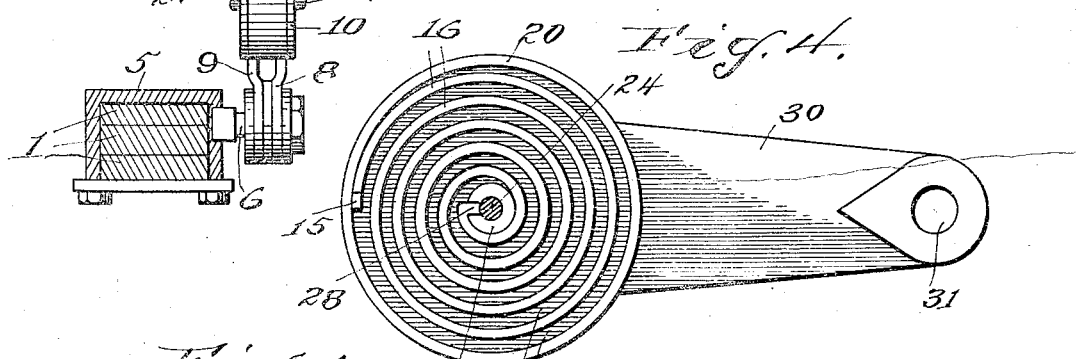
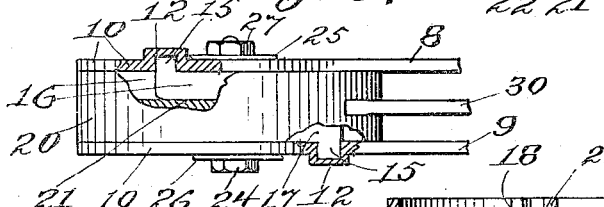
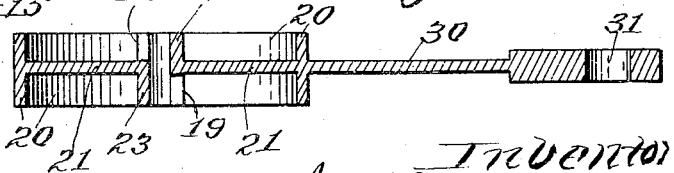
Witnesses:
Wm. E. Valk Jr.
R. F. Lansdale
Inventor
Joseph Benny
By C. F. Belt
Attorney

UNITED STATES PATENT OFFICE.

JOSEPH BENNY, OF NEWARK, NEW JERSEY.

SHOCK-ABSORBER.

1,037,583. Specification of Letters Patent. Patented Sept. 3, 1912.

Application filed June 25, 1912. Serial No. 705,730.

*To all whom it may concern:*

Be it known that I, JOSEPH BENNY, a subject of Franz Joseph, Emperor of Austria-Hungary, residing at Newark, in the county of Essex and State of New Jersey, have invented certain new and useful Improvements in Shock-Absorbers, of which the following is a specification.

This invention relates to shock absorbers, and pertains especially to a shock absorber for vehicles of various characters.

The object of the invention is to provide certain novel and peculiar combinations of special features in a shock absorber, as will produce improved results in the construction and operation of the same.

A further object of the invention is to provide a special arrangement and combination of a casing having an arm projecting therefrom, a pair of coil springs contained in the casing and a pair of levers pivoted to the casing and controlled by the springs.

Various other objects, advantages and improved results are attainable in the practical application of the invention.

In the accompanying drawings forming part of this application:—Figure 1— is a side elevation partly broken away exemplifying the application of the invention. Fig. 2— is an enlarged sectional view taken on the dotted line *a—a* Fig. 1. Fig. 3— is an enlarged sectional view taken on the dotted line *b—b* Fig. 1. Fig. 4— is a side elevation of the casing and one of the springs. Fig. 5— is an edge view partly broken away showing the spring anchors. Fig. 6— is a longitudinal section of the casing taken through its arm.

The same reference characters denote the same parts throughout the several views of the drawings:—

As shown in Figs. 1 and 2 of the drawings, the shock absorber is applied to the front spring 1, and a rear spring 2, such as are commonly used in automobiles or other vehicles, both of said springs being on the same side of the vehicle. The rear absorber is connected with the top and bottom of the rear spring by means of studs or bolts 3 extending from the usual spring clips 4. The front absorber is attached to one of the bottom clips 5 of the front spring by a stud or bolt 6, and to the top portion of this spring by means of a plate 7 and a stud or bolt 7ª. But such connections and attachments may be varied according to the character of springs upon which the absorber is used, or as occasion may demand in the application of the absorber.

A pair of levers 8 and 9 have one end fulcrumed on one of the studs at the bottom portion of the vehicle springs. The said levers being of the same shape and construction only one of them will be described herein in detail. Such lever 8 has a circular head 10, provided on its inner face with an annular flange 11, and has a cavity or socket 12, and a central bolt hole 13. The end of this lever has a thickened bearing face 14, provided with a hole for the fulcrum stud in attaching said end to a spring. The heads of the levers 8 and 9 carry coil springs 16 and 17, one end 15, of which is turned outwardly and is anchored in the cavity or socket 12 of the lever-heads adjacent to the annular flange. The other end of the springs is turned inwardly and is anchored in slotted hubs hereinafter more particularly described.

The annular flanges of the lever-heads with their springs fit within a circular casing 20, having a central web or partition 21, separating the said springs 16 and 17, and said partition is provided centrally with hubs 22 and 23, for a pivot bolt 24, having suitable washers 25 and 26, and said bolt extends through the holes 13 and through the hubs and is provided with a nut 27, for securing said heads to the casing. The hub 22 has a slot 18 for the inturned end 28 of the coil spring 16, and the hub 23 has a like slot 19 diametrically opposite the slot 18, for the inturned end of the spring 17. The casing 20 is provided with an arm 30 of the same length as the levers 8 and 9 and said arm projects from the periphery of the casing opposite the hub-slots 18 and 19, and is provided with a bearing end having a hole 31, for the fulcrum stud or bolt 7ª.

It will be seen that the heads of the levers 8 and 9 close the sides of the casing, that the annular flanges of said heads confine the springs 16 and 17 within the casing and upon the web or partition 21, and that by reason of the special anchoring of the said springs and the fact that the ends of both levers have the same fulcrum while the casing-arm is fulcrumed independently, a perfect shock absorber is produced.

I do not wish to limit or confine myself to any particular size or material in the manufacture of this shock absorber, nor do I wish to be understood as confining myself to the particular number of parts of the device herein shown and described, as the same may be varied in the manufacture of the device without departing from the invention as hereinafter claimed.

Having thus described my invention what I claim as new and desire to secure by Letters Patent is:—

1. A shock absorber for vehicles comprising a pair of levers having the same fulcrum mounting and each provided with a flanged head, a pair of coil springs each having one end anchored in one of the heads, a casing having a central web separating the springs, a pair of hubs on the web and having the other ends of said springs anchored therein, an arm projecting from the casing and fulcrumed independent of the said levers, and means for pivotally securing the heads and casing together.

2. The combination with a vehicle spring, a pair of levers fulcrumed to the bottom of said spring and each having a circular head, and a coil spring contained in each head and each spring having one end thereof anchored in one of the heads, of a casing having an arm fulcrumed to the top of the vehicle spring, a casing web having a hub on each side thereof in which the other ends of the coil springs are anchored, and means for pivotally securing the heads and the casing together.

3. In a shock absorber, the combination of a casing having a fulcrumed-arm projecting therefrom, a web central of the casing, a slotted hub on each side of the web, a pair of fulcrum levers each having a flanged head fitting the casing, a coil spring on each side of the web and each spring outwardly projecting and anchored in one of the heads and having an inwardly projecting end fitting the hub-slots, and means for pivotally connecting the heads and the casing with the latter between the heads.

In witness whereof I hereunto set my hand in the presence of two witnesses.

JOSEPH BENNY.

Witnesses:
 ALEX. W. BOGATKO,
 FRANK GORSHI.